United States Patent
Johannesson et al.

(10) Patent No.: US 8,908,046 B1
(45) Date of Patent: Dec. 9, 2014

(54) RELIABILITY DETERMINATION OF CAMERA FAULT DETECTION TESTS

(71) Applicant: Axis AB, Lund (SE)

(72) Inventors: Anders Johannesson, Hoellviken (SE); Stefan Lundberg, Lund (SE); Wilfried Rakow, Malmoe (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/248,959

(22) Filed: Apr. 9, 2014

(30) Foreign Application Priority Data

May 15, 2013 (EP) .................................... 13446503

(51) Int. Cl.
*H04N 17/00* (2006.01)
*H04N 17/02* (2006.01)

(52) U.S. Cl.
CPC .................................. *H04N 17/002* (2013.01)
USPC ......................................... 348/175; 348/187

(58) Field of Classification Search
USPC ............. 348/175, 161, 143, 207.99, 184, 187
IPC .............................................. H04N 17/00,17/02
See application file for complete search history.

(56) References Cited

U.S. PATENT DOCUMENTS

| | | | |
|---|---|---|---|
| 6,583,723 B2 | 6/2003 | Watanabe et al. | |
| 7,456,736 B2 | 11/2008 | Primm et al. | |
| 2007/0126869 A1 | 6/2007 | Montminy et al. | |
| 2007/0247526 A1* | 10/2007 | Flook et al. | 348/161 |
| 2009/0303324 A1 | 12/2009 | Greenhill et al. | |
| 2011/0187488 A1 | 8/2011 | Fiske et al. | |
| 2011/0261195 A1 | 10/2011 | Martin et al. | |
| 2012/0026326 A1 | 2/2012 | Itoh et al. | |
| 2012/0262576 A1 | 10/2012 | Sechrist et al. | |

FOREIGN PATENT DOCUMENTS

JP        2001006056 A       1/2001

OTHER PUBLICATIONS

European Search Report, Issued on Sep. 12, 2013 for EPO No. 13446503.8 filed on May 15, 2013.
World Patent Technology Search Report, Issued on Dec. 14, 2012 for Novelty Search of Level 3 concerning "WeatherCompDegradeDetect". (2 pages).

* cited by examiner

*Primary Examiner* — Trang U Tran
(74) *Attorney, Agent, or Firm* — Oblon, Spivak, McClelland, Maier & Neustadt, L.L.P.

(57) ABSTRACT

There is provided a method for determining the reliability of a fault detection of a camera in a camera system. According to the method data relating to environmental conditions are received (204) and compared to accessed (202) criteria relating to environmental conditions external to the camera and affecting the reliability of the fault detection test. If the received data complies with the criteria it is determined (206) that the fault detection test gives a reliable result. This is advantageous in that false fault detection tests may be identified.

9 Claims, 4 Drawing Sheets

RELIABILITY DETERMINATION OF CAMERA FAULT DETECTION TESTS

TECHNICAL FIELD

The present invention relates to the field of fault detection of cameras. In particular it relates to a method for determining the reliability of a fault detection of a camera in a camera system

BACKGROUND

Cameras are commonly used for monitoring purposes. For example, cameras may be arranged to monitor premises or vehicles. As the cameras degrade or get out of order, maintenance staff is sent out to repair or replace the cameras. Typically, a monitoring camera is arranged at a remote location and it is therefore costly to send out maintenance staff to perform service work on the cameras.

In order to mitigate this problem, the cameras may perform self-tests such that the cameras themselves may detect if there is a fault which needs to be attended to. If a camera detects that there is fault, maintenance staff may be notified and can take necessary action to repair or replace the camera.

There are different ways of performing self-tests. US2007126869 A1 discloses an automatic camera health monitoring which measures the health of a camera by comparing a current image to a set of stored images. The camera detects a fault if the measured health exceeds a threshold.

A drawback of the known self-tests is that they may give an unreliable result. As a consequence, maintenance staff may be sent out to repair the cameras in vain.

SUMMARY OF THE INVENTION

In view of the above, it is thus an object of the present invention to mitigate the above drawbacks and to provide a method and an apparatus for determining the reliability of a fault detection made by a camera.

According to a first aspect, this object is achieved by a method for determining the reliability of a fault detection of a camera in a camera system, the camera system being arranged to perform a fault detection test to detect a fault of the camera based on data acquired by the camera, the method comprising: the camera system accessing criteria relating to environmental conditions external to the camera and affecting the reliability of the fault detection test; the camera system receiving data relating to the environmental conditions at a time point; and the camera system checking whether the data relating to the environmental conditions complies with the criteria, thereby determining whether the fault detection test gives a reliable result at that time point.

As the inventors have realised, to conduct a self-test it is important to know that the generated pictures meet expectations. Camera pictures look different under varying conditions. Hence it is important to know those conditions that cannot be obtained by an internal camera sensor. For example, in order to compare pictures, the pictures should preferably be taken on a sunny day because then there is high contrast in the pictures. One could therefore choose to take snapshots at noon and analyse or compare those pictures. However, in case of a cloudy sky, the pictures would not look as expected. Another weather situation that could have impact is when it is sunny but there has been a heavy shower just before taking the picture. Then there might be rain drops on the camera housing rendering the picture taken useless for comparison. Water puddles might also cause a lot of reflections so that the picture cannot be taken into account. Further, during the night, conditions can also vary a lot. There is a huge difference in taking pictures with bright sky and full moon as compared to a clouded, dark sky.

Accordingly, external environmental conditions, such as fog, motion or darkness, may affect the result of a fault detection test. In particular, a fault detection test only gives a reliable result if the environmental conditions external to the camera complies with certain criteria. For example, in order to test the infrared (IR) functionality of a camera, darkness is needed. Thus, a test of the IR functionality only gives a reliable result if it is dark. Another example is that in order to test if condensation has started to appear on the inside of the camera, giving rise to blurry images, moist external conditions are needed. Thus, a test pertaining to deciding whether condensation has started inside the camera only gives a reliable result if it is moist around the camera. Still another example is that contrast, sharpness and edges of images captured by the camera may be checked in order to see whether optical components in the camera, such as the image sensor, the lens or the protection glass, are stained, worn or has other problems. However, also external factors such as fog or motion of the camera may affect the contrast, sharpness and edges in the images. Thus, a fault test relating to the optical components in the camera only gives a reliable result if there is no fog and/or if the camera is stationary.

In order to determine the reliability of a specific fault detection test, the method therefore proposes to receive data representative of the environmental conditions at a certain time point, and to check whether the received environmental conditions complies with criteria which are set up with respect to the specific fault detection test. If the criteria are fulfilled, it is determined that the fault detection test at hand gives a reliable result at the certain time point. In this way, the method hence provides a measure for determining the reliability of a fault detection of the camera.

As used herein, a fault of the camera means that the camera does not fulfill predefined specifications set up for the camera. The fault may be a hardware fault, for example a fault in the optical components of the camera. The fault may also be a fault in the software of the camera, or a fault in the calibration of the camera. Generally, if such faults are detected, maintenance staff needs to attend to the faults and repair or replace the camera.

As used herein, environmental conditions external to the camera may be any condition which is caused by other factors than the camera itself. Typically, the environmental conditions may relate to weather conditions, such as pressure conditions, temperature conditions, moisture conditions etc. Further examples of environmental conditions are time, motion of the camera, and the amount of light around the camera.

The data relating to the environmental conditions at a time point may comprise data from a weather service, a pressure sensor, a motion sensor, a thermometer, a hygrometer, a photometer, an image sensor, or a clock. The data from a weather service may comprise a weather forecast for the geographical region where the camera is located. The motion sensor may for example comprise a vibration sensor, an accelerometer and/or a gyrometer.

The data relating to the environmental conditions at a time point may comprise data from a sensor external to the camera.

The data relating to the environmental conditions at a time point may comprise data from a sensor being arranged at the camera itself, either internally or externally of the camera. Alternatively, or additionally, the data relating to the environmental conditions at a time point may comprise data from one or more other cameras in the camera system. In this way not every camera in the camera system needs to be provided with sensors for measuring environmental conditions.

The camera system may further receive an indication that a fault detection test is to be performed. In response to the receipt of the indication, the camera system may determine the reliability of the fault detection test as described above. Thus, the reliability of the fault detection test may be determined in real time upon receipt of an indication to do so.

The method may further comprise performing the fault detection test.

According to one embodiment, the fault detection test is performed prior to checking whether the data relating to the environmental conditions at a time point are compliant with the criteria, such that the checking thereby provides a verification of the fault detection test performed at that time point. This is advantageous in that a verification of the performed fault detection test is obtained.

According to one embodiment, the checking whether the data relating to the environmental conditions at a time point are compliant with the criteria is performed only if the fault detection test indicates a fault. As discussed above, it is of interest to avoid false fault detections since false fault detections cause maintenance staff to be sent out in vain. In this embodiment, the verification is only performed to verify if an indicated fault is true or false, and not whether an indication that there is no fault is true or false. This is advantageous in that no unnecessary verifications are made.

The method may further comprise the camera system transmitting data indicative of the outcome of the fault detection test together with data indicative of the reliability of the fault detection test to an external receiver. In this way, maintenance staff located at a remote location may be provided with the result of the fault detection test as well as a measure of the reliability of the fault detection test. Based on this information, the maintenance staff may decide to not attend to false fault detections.

According to one embodiment, the time point is a current time point, and the camera system performs the fault detection test only if the data regarding the environmental conditions complies with the criteria. In other words, the camera system checks that the current external conditions are such that the fault detection test gives a reliable result before performing the fault detection test. In this way, the camera system may avoid making any unnecessary fault detection test that anyhow would not give a reliable result. For example, the camera system may avoid making an IR functionality test if it is too light around the camera.

The method may further comprise generating an alarm event if the fault detection test indicates a fault and the data regarding the environmental conditions complies with the criteria. Thus, the camera system may generate an alarm event if a reliable fault detection has been made.

The criteria relating to environmental conditions may comprise a plurality of predefined sub-criteria, each sub-criteria corresponding to a different level of reliability of the fault detection test. In this way a fault detection test may be associated with different levels of reliability, such as a low, a medium, and a high level of reliability.

The fault detection test may be based on image data acquired by the camera. However, generally, the fault detection may be based on any sensor or combinations of sensors arranged at the camera.

According to a second aspect, the above object is achieved by a camera system comprising: a camera; and a processing unit for performing a fault detection test to detect a fault of the camera based on data acquired by the camera, and for determining the reliability of a fault detection of the camera, the processing unit being arranged to: access criteria relating to environmental conditions external to the camera and affecting the reliability of the fault detection test; receive data relating to the environmental conditions at a time point; and check whether the data relating to the environmental conditions at a time point complies with the criteria, the processing unit thereby being arranged to determine whether the fault detection test gives a reliable result at that time point.

According to a third aspect, the above object is achieved by a computer program product comprising a computer-readable medium, the computer program product comprising computer code portions configured to perform the method of the first aspect when loaded and run on a device having processing capability. The computer-readable medium may be a non-transitory computer-readable medium.

The second and the third aspect may generally be embodied in the same way as the first aspect. Generally, the second and the third aspects have the same advantages as the first aspect.

It is noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, member, element, etc.]" are to be interpreted openly as referring to at least one instance of said device, member, element etc., unless explicitly stated otherwise.

BRIEF DESCRIPTIONS OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
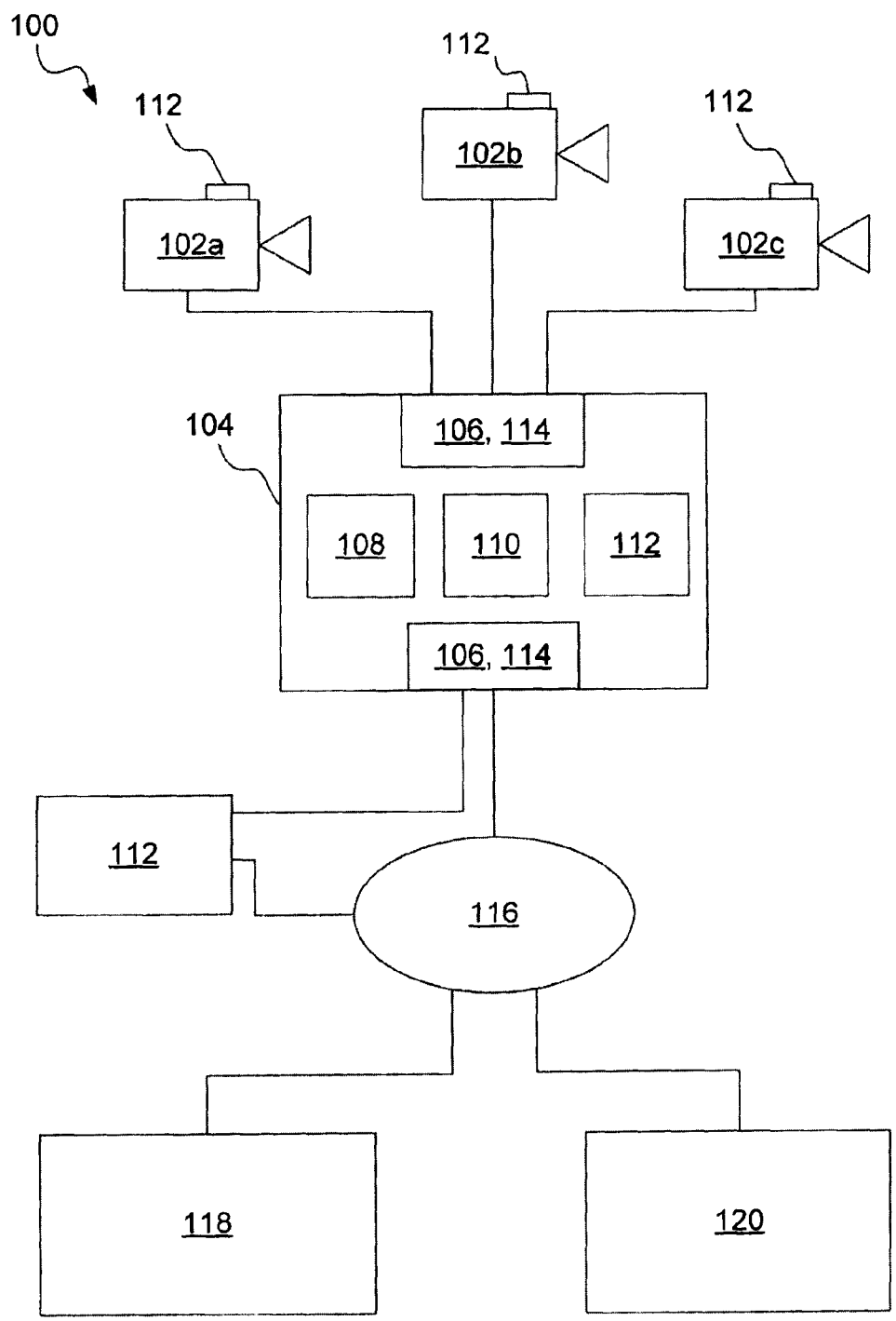
FIG. 1 is a schematic illustration of a camera system according to embodiments of the invention.

FIG. 1 shows a camera system 100. The camera system 100 comprises one or more cameras, here illustrated by three cameras 102*a-c*. The camera system 100 further comprises a processing device 104. The processing device 104 is operatively connected to the cameras 102*a-c* such that the processing device 104 may communicate with the cameras 102*a-c*. The connection may be wired or wireless. The processing device 104 may for example comprise a receiver 106 and a transmitter 114 via which the processing device 104 may receive data from the cameras 102a-c and transmit data to the cameras 102a-c. The processing device 104 may be a unit which is separate from the cameras 102a-c as shown in FIG. 1. Alternatively, the processing device 104 may be included in one of the cameras 102a-c.

The processing device 104 further comprises a processing unit 108, such as a central processing unit. As will be described below, the processing unit 108 is configured to carry out any method disclosed herein. The processing device 104 may also comprise a memory 110. The memory 110 may serve as a non-transitory computer-readable medium having stored thereon computer code portions adapted to perform any method disclosed herein, for example when run by the processing unit 108. The memory 108 may also serve as a storage of predefined data, such as criteria relating to environmental conditions external to the cameras 102a-c and affecting the reliability of fault detection tests carried out with respect to the cameras 102a-c.

The camera system 100 may further comprise one or more sensors 112. The sensors 112 may be arranged at the cameras 102a-c, either internally or externally of the cameras, at the processing device 104, or as a separate unit. If the sensor 112 is a separate unit, the processing device 104 may receive data from the sensor 112 via the receiver 106, either directly or via a network 116. The sensors 112 may for example be a pressure sensor, a motion sensor, a thermometer, a hygrometer, a photometer, an image sensor, or a clock. The motion sensor may for example comprise a vibration sensor, an accelerometer and/or a gyrometer. The processing device 104 may also be connected to an external server or database 120, for example via a network 116, from which it may receive data relating to environmental conditions at a certain time point. For example, the external server or database 120 may be a weather service which provides the processing device 104 with a weather forecast for the geographical region where the cameras 102a-c are located.

The camera system 100 may further be connected to an external receiver 118 at a remote location, for example via the network 116. The external receiver 118 may for example be part of a computer station where maintenance staff monitors any fault detections of the cameras 102a-c.

The camera system 100 is arranged to perform fault detection tests in order to detect faults of the cameras 102a-c, i.e. to detect whether the cameras 102a-c fail to fulfil their predefined specifications. One example of a fault detection test is to compare certain statistical data for a captured image with reference values. The statistical data may e.g. concern luminance, colour, contrast, acutance, image features such as lines, edges or other local interest points. The fault detection tests may be carried out in any way known in the art. Typically, a fault detection test is based on data acquired by the camera 102a-c. For example, a fault detection test may be carried out based on image data captured by the camera 102a-c to which the fault detection test pertain. The fault detection test may also be based on data from one or more of the sensors 112. Different types of fault detection tests may be carried out based on different types of data. The fault detection test may be carried out by the cameras 102a-c themselves. Preferably, however, the fault detection tests are carried out by the processing unit 108 of the processing device 104. Examples of fault detection tests are to check if optical components, such as the sensor, the lens or the protection glass are stained or worn. Other examples are to check different functionalities of the camera 102a-c, such as the IR functionality. Yet another example is to check whether there is condensation inside the camera.

Generally, each fault detection test may be associated with a certain criteria. The criteria may be expressed in terms of one or more environmental conditions external to the camera 102a-c. The one or more environmental conditions are such that they affect the reliability of the particular fault detection test. The criteria may for example be associated with as a set of values of the one or more environmental conditions. If the measured environmental conditions at a point in time falls within the set of values associated with the criteria, then the criteria is complied with. For example, if a certain criteria is expressed in terms of a single environmental condition, the set of values may correspond to a one-dimensional set, such as an interval, of values that the single environmental condition may take. If a certain criteria is expressed in terms of more than one environmental condition, the set of values may correspond to a multi-dimensional set, such as a multi-dimensional interval, of values that the more than one environmental condition may take. However, as the skilled person understands, the set of values used to define the criteria may take any form.

To exemplify, suppose that a specific fault detection test only gives a reliable result if it is performed when the temperature is above a certain temperature value. The criteria corresponding to such a fault detection test is thus associated with the temperature interval starting at the certain temperature value.

As a further example, suppose that a specific fault detection test only gives a reliable result if it is dark and the camera is stationary. A criteria corresponding to such a fault detection test may be expressed in terms of the environmental conditions darkness and motion. For example, the criteria may be associated with a two-dimensional set, such as a two-dimensional interval, defining the darkness and motion levels for which the fault detection test gives a reliable result.

The criteria may also comprise a plurality of predefined sub-criteria. Each sub-criterion may correspond to a different level of reliability of the fault detection test. For example, in case the criteria are defined in terms of sets of values of environmental conditions, the sub-criteria may correspond to different subsets of that set. For example, a number of subsets, such as a number of sub-intervals, may be defined wherein the subsets are associated with different levels of reliability. For instance, consider a situation where the criteria are defined by three sub-criteria corresponding to the interval [c, d] being a subset of the interval [b, e] which in turn is a subset of the interval [a, f]. The narrowest interval may then be associated with a high reliability, the intermediate interval may correspond to a medium reliability, and the widest interval may correspond to a low reliability.

Figure 2:
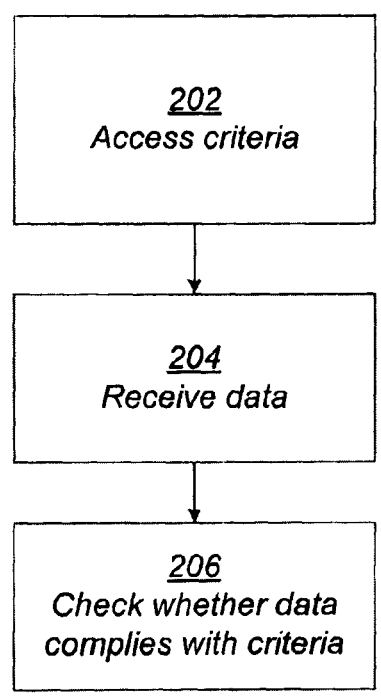
FIG. 2 is a flow chart of a method for determining the reliability of a fault detection according to embodiments of the invention.

A method for determining the reliability of a fault detection test will now be described with reference to FIG. 1 and the flowchart of FIG. 2.

The processing device 104, and in particular the processing unit 108, accesses in step 202 criteria relating to environmental conditions external to the camera 102a-b and affecting the reliability of the fault detection test at hand. For example, the criteria may be accessed from the memory 110 or received by the receiver 106 from an external storage unit. As discussed above, the criteria may be expressed in terms of a set of values of the environmental conditions which affects the fault detection test.

Next, in step 204, the processing unit 108 receives data relating to the environmental conditions at a point in time. The point in time may be the time point at which the fault detection test was performed or will be performed, such as the current time point. The processing unit 108 may receive the data relating to the environmental conditions at a time point via the receiver 106 from one of the cameras 102a-b or from an external server or database 120. The data may be received from another camera 102a-c in the camera system 100 than the camera to which the fault detection test pertains. The data relating to the environmental conditions are typically measurements performed by one or more of the sensors 112 or are input from an external server or database 120, such as a weather service.

The processing unit 108 then proceeds to check whether the received data relating to the environmental conditions complies with the criteria. For example the processing unit 108 may check whether the received data relating to the environmental conditions falls within a predefined set values of the environmental conditions as defined by the criteria. If the criteria are fulfilled, the processing unit 108 determines that the fault detection test gives a reliable result at the point of time which corresponds to the received environmental conditions.

Figure 3:
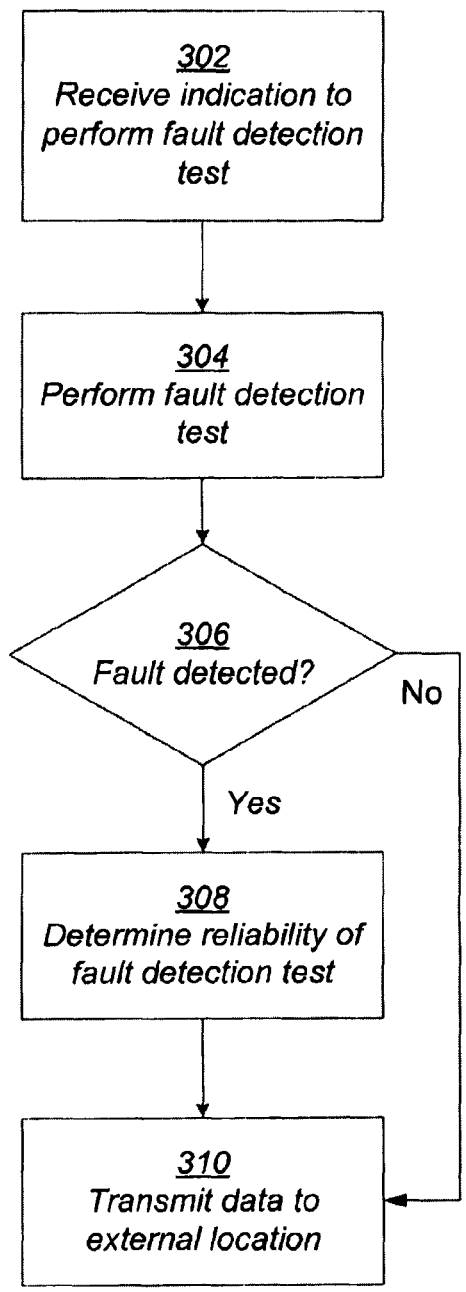
FIG. 3 is a flow chart of a method for performing a fault detection test and determining its reliability according to embodiments of the invention.

An example embodiment will now be described with reference to the flowchart of FIG. 3.

In step 302, the processing unit 108 receives an indication to perform a fault detection test, in this case to test the IR functionality of the camera 102a. The indication may for example be received from maintenance staff via a remote computer station associated with the external receiver 118.

In step 304, the processing unit 108 in association with the camera 102a performs the fault detection test, i.e. tests the IR functionality of the camera 102a, according to any procedures known in the art. When performing a fault detection test for IR illumination a filter which removes the natural light might be used. Next, in step 306, the processing unit 108 checks whether the fault detection test indicates that there is a fault with the camera 102a, i.e. that there is a problem with the IR functionality of the camera 102a. If no fault is detected, an indication that no fault was detected may be transmitted to an external location, step 310. In this example, however, the processing unit 108 finds out that the fault detection test indicates that there is a problem with the IR functionality. Since a fault has been detected, the processing unit 108 proceeds to verify the result of the fault detection test, step 308, by determining the reliability of the fault detection test.

In order to determine the reliability of the fault detection test, the processing unit 108 accesses from memory 110 the criteria relating to the environmental conditions external to the camera 102a being associated with the fault detection test of testing the IR functionality. In this example, the criteria being associated with the IR functionality test is expressed in terms of a darkness level. More precisely, the criteria specify that the IR functionality test gives a result of high reliability if the darkness level is below a first value, that the IR functionality test gives a result of medium reliability if the darkness level is below a second value which is larger than the first value, and that the IR functionality test give a result of low reliability if the darkness level is below a third value which is larger than the second value. If the darkness level is above the third value, the IR functionality test gives an unreliable result.

In order to check whether these criteria are complied with, the processing unit 108 sends out a request to sensor 112 being a photometer arranged at the camera 102a to measure the darkness level. In response to the request, the processing unit 108 receives data relating to the current darkness level from the sensor 112. The processing unit 108 then checks whether the current darkness level received from the sensor complies with the criteria. More precisely, the processing unit 108 checks whether the current darkness level is below the first value, the second value and the third value specified by the criteria. In the present example, it turns out that the darkness level was between the second value and the third value. Thus, the processing unit 108 determines that the fault detection test—the IR functionality test—gives a result of low reliability.

The processing unit 108 then transmits, in step 310, the outcome of the fault detection test together with data indicative of the reliability of the fault detection test to the external receiver 118. In this case, the transmitted data provides indication that a fault was detected in the IR functionality of the camera 102a and that the fault detection is of low reliability. Maintenance staff receiving the data from the processing unit 108 may thus draw conclusions from the received data and decide whether to undertake any further action.

Figure 4:
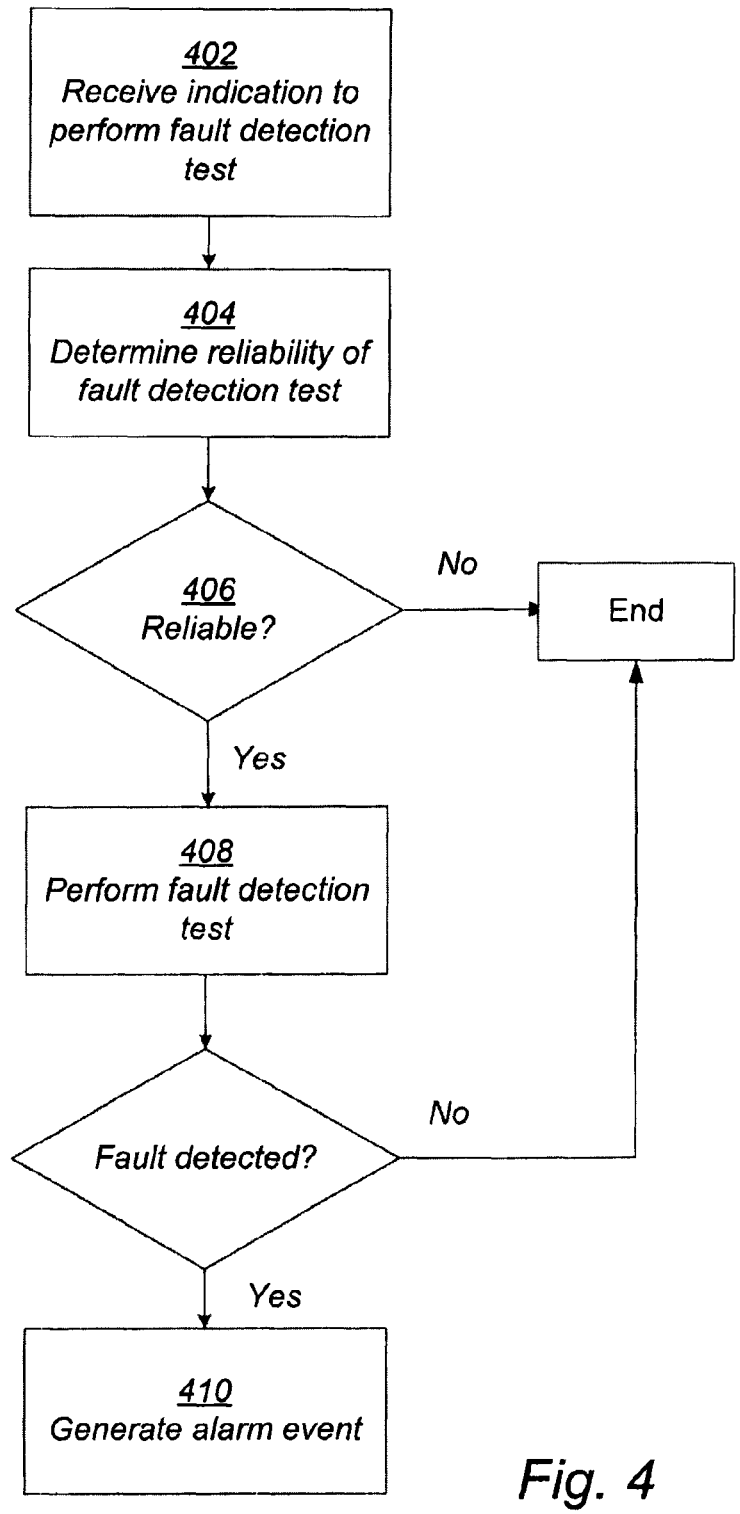
FIG. 4 is a flow chart of a method for performing a fault detection test which is determined to give a reliable result according to embodiments of the invention.

Another example embodiment will now be described with reference to the flowchart of FIG. 4.

In step 402, the processing unit 108 receives an indication to perform a fault detection test, in this case to test whether condensation has started to appear on the inside of the camera 102a giving rise to blurry images. The indication may for example be received from maintenance staff via a remote computer station associated with the external receiver 118.

Prior to performing the fault detection test, the processing unit 108 checks whether such a fault detection test currently gives a reliable result. In order to do so, the method proceeds as disclosed with reference to FIG. 2. In brief, the processing unit 108 thus accesses criteria associated with the fault detection test, in this case the condensation test. In this example, the criteria are expressed in terms of the environmental conditions moisture and temperature. Specifically, the moisture should be above a certain moisture level and the temperature should be below a certain temperature level.

In the present example, the camera 102b is not provided with any sensors 112. The processing unit 108 therefore requests sensor 112 being a hygrometer arranged at another camera 102b to measure the moisture level. In response thereto, the processing unit 108 receives a current moisture level from the sensor 112 of camera 102b. Further the processing unit 108 receives via the receiver 106 and the network 116 a temperature level from a weather service running on the server 120. The received temperature level is from a weather forecast for the geographical region where the camera 102 is located.

Based on the received data relating to the current moisture level and the current temperature level, the processing unit 108 checks in step 406 whether the criteria is fulfilled, i.e. whether the moisture level is above the certain moisture level and whether the temperature level is below the certain temperature level. If not, the processing unit 108 takes no further action.

However, in the present example it turns out that the criteria was complied with. This means that the fault detection test, i.e. the condensation test, currently gives a reliable result. Therefore, the processing unit 108 proceeds to perform the fault detection test in step 408 in association with the camera 102a. If no fault is detected, then the processing unit takes no further action. However, in this case the fault detection test resulted in that a fault was detected. As a consequence, the processing unit 108 in step 410 generates an alarm event since a fault is detected and the fault detection is reliable. The alarm event may for example be sent to the external receiver 118 so that maintenance staff can take any necessary action.

It will be appreciated that a person skilled in the art can modify the above-described embodiments in many ways and still use the advantages of the invention as shown in the embodiments above. For example, the sets used to define the criteria may take any form and are not restricted to intervals. Further, the data relating to the environmental conditions at a time point may be collected and stored, such that verification of fault detection tests may be performed at a later time point.

The invention claimed is:

1. A method for determining the reliability of a fault detection of a camera in a camera system, the camera system being arranged to perform a fault detection test to detect a fault of the camera based on data acquired by the camera, the method comprising:

the camera system accessing criteria relating to environmental conditions external to the camera and affecting the reliability of the fault detection test;

the camera system receiving data relating to the environmental conditions at a time point;

the camera system checking whether the data relating to the environmental conditions complies with the criteria, thereby determining whether the fault detection test gives a reliable result at that time point; and wherein the time point is a current time point, and the camera system performs the fault detection test only if the data regarding the environmental conditions complies with the criteria, wherein the data relating to the environmental conditions at a time point comprises data from a weather service, a pressure sensor, a motion sensor, a thermometer, a hygrometer, a photometer, or an image sensor.

2. The method of claim 1, wherein the data relating to the environmental conditions at a time point comprises data from a sensor external to the camera.

3. The method of claim 1, wherein the data relating to the environmental conditions at a time point comprises data from one or more other cameras in the camera system.

4. The method of claim 1, further comprising the camera system receiving an indication that the fault detection test is to be performed.

5. The method of claim 1, further comprising generating an alarm event if the fault detection test indicates a fault and the data regarding the environmental conditions complies with the criteria.

6. The method of claim 1, wherein the criteria relating to environmental conditions are associated with a set of values of the environmental conditions, and wherein the criteria comprises a plurality of predefined sub-criteria which correspond to different subsets of the set of values of the environmental conditions, each sub-criteria corresponding to a different level of reliability of the fault detection test.

7. The method of claim 1, wherein the fault detection test is based on image data acquired by the camera.

8. A camera system comprising a camera, and a processing unit for performing a fault detection test to detect a fault of the camera based on data acquired by the camera, and for determining the reliability of a fault detection of the camera, the processing unit being arranged to:

access criteria relating to environmental conditions external to the camera and affecting the reliability of the fault detection test, receive data relating to the environmental conditions at a time point; and check whether the data relating to the environmental conditions at a time point complies with the criteria, the processing unit thereby being arranged to determine whether the fault detection test gives a reliable result at that time point, wherein the time point being a current time point, and the processing unit being arranged to perform the fault detection test only if the data regarding the environmental conditions complies with the criteria, wherein the data relating to the environmental conditions at a time point comprises data from a weather service, a pressure sensor, a motion sensor, a thermometer, a hygrometer, a photometer, or an image sensor.

9. A non-transitory computer-readable medium having stored thereon computer code portions configured to perform the method of claim 1 when loaded and run on a device having processing capability.

* * * * *